US011506479B2

(12) United States Patent
Schab et al.

(10) Patent No.: US 11,506,479 B2
(45) Date of Patent: Nov. 22, 2022

(54) NON-INVASIVE QUANTITATIVE MULTILAYER ASSESSMENT METHOD AND RESULTING MULTILAYER COMPONENT

(71) Applicant: General Electric Company, Schenectady, NY (US)

(72) Inventors: Johannes Clemens Schab, Birr-Aargau (CH); Sophie Betty Claire Duval, Baden-Aargau (CH); Piero-Daniele Grasso, Birr-Aargau (CH); Julien Rene Andre Zimmermann, Birr-Aargau (CH); Norbert Lucke, Birr-Aargau (CH)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 374 days.

(21) Appl. No.: 16/701,243

(22) Filed: Dec. 3, 2019

(65) Prior Publication Data
US 2020/0182608 A1 Jun. 11, 2020

(30) Foreign Application Priority Data
Dec. 6, 2018 (EP) .................................. 18210779

(51) Int. Cl.
*G01B 11/06* (2006.01)
*F01D 5/28* (2006.01)
(Continued)

(52) U.S. Cl.
CPC .......... *G01B 11/0683* (2013.01); *F01D 5/288* (2013.01); *F01D 21/003* (2013.01);
(Continued)

(58) Field of Classification Search
CPC ..... G01B 11/0683; G01B 21/08; F01D 5/288; F01D 21/003; G01N 2291/0258; G01N 2291/02854
(Continued)

(56) References Cited

U.S. PATENT DOCUMENTS 3,961,910 A * 6/1976 Baladjanian ............ C23C 10/58
205/228
5,427,866 A * 6/1995 Nagaraj .................. B32B 15/01
428/629
(Continued)

FOREIGN PATENT DOCUMENTS

CN 103075972 A * 5/2013
WO 2005007785 A2 1/2005

OTHER PUBLICATIONS

"Paints and Varnishes-Determination of Film Thickness" (ISO 2808:2007), European Committee for Standardization, Feb. 2007, 43 pages.
(Continued)

*Primary Examiner* — Isiaka O Akanbi
(74) *Attorney, Agent, or Firm* — Armstrong Teasdale LLP

(57) ABSTRACT

A method of analyzing layer thickness of a multilayer component is provided. The method includes: creating an opening having a predefined geometry partially into the multilayer component at a selected location on a surface of the multilayer component. The multilayer component includes a plurality of material layers including a substrate and a bond coat. The opening exposes each of the plurality of material layers including the substrate. Contrast of the exposed plurality of material layers can be increased. An image is created of the exposed layers in the opening using a digital microscope, and thickness of a bond coat, thickness of a depletion layer\ and/or thickness of an oxide layer is calculated from the image and based on the predefined
(Continued)

geometry of the opening. Repairing the opening, allows the multilayer component to be used for an intended purpose after testing, e.g., re-installed and reused in a gas turbine.

20 Claims, 5 Drawing Sheets

(51) Int. Cl.
    *F01D 21/00*     (2006.01)
    *G01B 21/08*     (2006.01)

(52) U.S. Cl.
    CPC ...... *G01B 21/08* (2013.01); *G01N 2291/0258* (2013.01); *G01N 2291/02854* (2013.01)

(58) Field of Classification Search
    USPC .................. 356/628–630, 503, 485, 357
    See application file for complete search history.

(56) References Cited

U.S. PATENT DOCUMENTS

| | | | |
|---|---|---|---|
| 5,455,119 A * | 10/1995 | Taylor | C23C 4/06 |
| | | | 420/443 |
| 5,629,132 A * | 5/1997 | Suzuki | B24C 1/04 |
| | | | 430/167 |
| 6,306,524 B1 * | 10/2001 | Spitsberg | B32B 15/01 |
| | | | 428/654 |
| 6,455,167 B1 * | 9/2002 | Rigney | C23C 28/00 |
| | | | 428/472 |
| 6,551,063 B1 * | 4/2003 | Lee | F01D 5/186 |
| | | | 416/224 |
| 6,559,942 B2 * | 5/2003 | Sui | H01J 37/32935 |
| | | | 257/E21.252 |
| 7,316,850 B2 * | 1/2008 | Hu | F01D 5/288 |
| | | | 420/444 |
| 9,719,353 B2 * | 8/2017 | Bolcavage | C23C 28/023 |
| 9,975,812 B2 * | 5/2018 | Doesburg | C04B 35/482 |
| 11,181,000 B2 * | 11/2021 | Nagaraj | C22F 1/10 |
| 2005/0064228 A1 * | 3/2005 | Darolia | C23C 28/325 |
| | | | 205/255 |
| 2005/0079368 A1 * | 4/2005 | Gorman | C25D 5/48 |
| | | | 427/446 |
| 2006/0093851 A1 * | 5/2006 | Darolia | C23C 30/00 |
| | | | 416/241 R |
| 2008/0138647 A1 * | 6/2008 | Jiang | C23C 26/00 |
| | | | 428/650 |
| 2009/0252987 A1 * | 10/2009 | Greene, Jr. | G01N 29/2431 |
| | | | 29/402.09 |
| 2009/0311416 A1 * | 12/2009 | Nelson | C23C 4/18 |
| | | | 427/560 |
| 2010/0215148 A1 * | 8/2010 | Torigoe | G01N 1/286 |
| | | | 83/13 |
| 2011/0052386 A1 | 3/2011 | Schoonover et al. | |
| 2012/0251777 A1 * | 10/2012 | Duval | B22F 1/16 |
| | | | 428/221 |
| 2013/0230739 A1 * | 9/2013 | Burns | C23C 28/3215 |
| | | | 428/680 |
| 2014/0253928 A1 * | 9/2014 | Jensen | G01B 11/0683 |
| | | | 356/503 |

OTHER PUBLICATIONS

Extended European Search Report for related matter 18210779.7 dated Aug. 7, 2019; 10 pp.
Partial European Search Report for related matter 18210779.7 dated May 7, 2019; 17 pp.
"Paints and varnishes—Wedge-cut method for determination of film thickness (scribe and drill method);" International Standard ISO 19399.2016(E); First edition; May 1, 2016; 11 pp.

* cited by examiner

US 11,506,479 B2

NON-INVASIVE QUANTITATIVE MULTILAYER ASSESSMENT METHOD AND RESULTING MULTILAYER COMPONENT

CROSS-REFERENCE TO RELATED APPLICATIONS

This application claims the benefit of European Patent Application No. 18210779.7 filed Dec. 6, 2018, the disclosure of which is herein incorporated by reference in its entirety.

BACKGROUND OF THE INVENTION

The disclosure relates generally to non-destructive material testing, and more particularly, to a method of analyzing quantitative data about layer(s) of a multilayer component, and a resulting multilayer component.

Quantitative investigations and quality checks of materials properties are oftentimes required to determine, for example, an applied coating thickness, a depletion level, etc. Such assessments are oftentimes required for process qualification, regular production monitoring, determining the remaining lifetime for a multilayer component or as an initial assessment to determine the scope of a repair for a multilayer component. In order to conduct these assessments, a cut up is taken from a commercial component. Consequently, the component is destroyed (scrapped) and needs to be replaced by a new part. Limited non-destructive tests are available to assess, e.g., interface delamination or layer thicknesses with thermography, etc. for ceramic layers on metallic substrates. However, these approaches lack the ability to provide quantitative data regarding lifetime relevant properties, and in particular, depletion of a bond coat. In addition, such assessments cannot be performed on-site (neither in-situ nor on a dismounted part).

BRIEF DESCRIPTION OF THE INVENTION

A first aspect of the disclosure provides a method of analyzing layer thickness of a multilayer component, the method comprising: creating an opening having a predefined geometry partially into the multilayer component at a selected location on a surface of the multilayer component, wherein the multilayer component includes a plurality of material layers including a substrate and a bond coat and the opening exposes each of the plurality of material layers including the substrate; creating an image of the exposed plurality of material layers in the opening using a digital microscope; and calculating at least a thickness of the bond coat of the exposed plurality of material layers from the image and based on the predefined geometry of the opening.

A second aspect of the disclosure provides a multilayer component, comprising: a substrate; a bond coat over the substrate; a thermal barrier coating (TBC) layer over the bond coat, the TBC layer having a first outer surface having indication of exposure to a hot gas path environment; and a filled opening in the substrate, the bond coat and the TBC layer, the filled opening including: a substrate repair fill filling the filled opening in the substrate; a bond coat repair fill filling the filled opening in the bond coat, and a thermal barrier coating (TBC) plug filling the filled opening in the TBC layer, the TBC plug having a second outer surface having no or less indication of exposure to the hot gas path environment.

A third aspect of the disclosure includes a method of analyzing layer thickness of a multilayer component, the method comprising: drilling to create an opening having a predefined geometry partially into the multilayer component at a selected location on a surface of the multilayer component, wherein the multilayer component includes a plurality of material layers including a substrate, a bond coat over the substrate, and wherein the opening exposes each of the plurality of material layers; increasing a contrast of the exposed plurality of material layers exclusively in the opening from that present after the opening creating by polishing the exposed plurality of material layers, and etching the exposed plurality of material layers; creating an image of the exposed plurality of material layers in the opening using a digital microscope; calculating at least a thickness of the bond coat from the image and based on the predefined geometry of the opening; and repairing the opening, allowing the multilayer component to be used for an intended purpose thereof.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant parts of a multilayer component. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

Where an element or layer is referred to as being "on," "engaged to," "disengaged from," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Embodiments of the disclosure provide a method to analyze quantitative data, like layer thickness, of a multilayer component. The method obtains the required quantitative data with a mini-invasive impact of a multilayer component. In particular, an opening is created in the multilayer component that can be fully restored, where necessary, using available (local) repair procedures while enabling the reuse of the commercial multilayer component. In addition, the component assessment can be performed during component manufacture and at the site of use. The component can be repaired on-site using on-site repair solutions.

Figure 1:
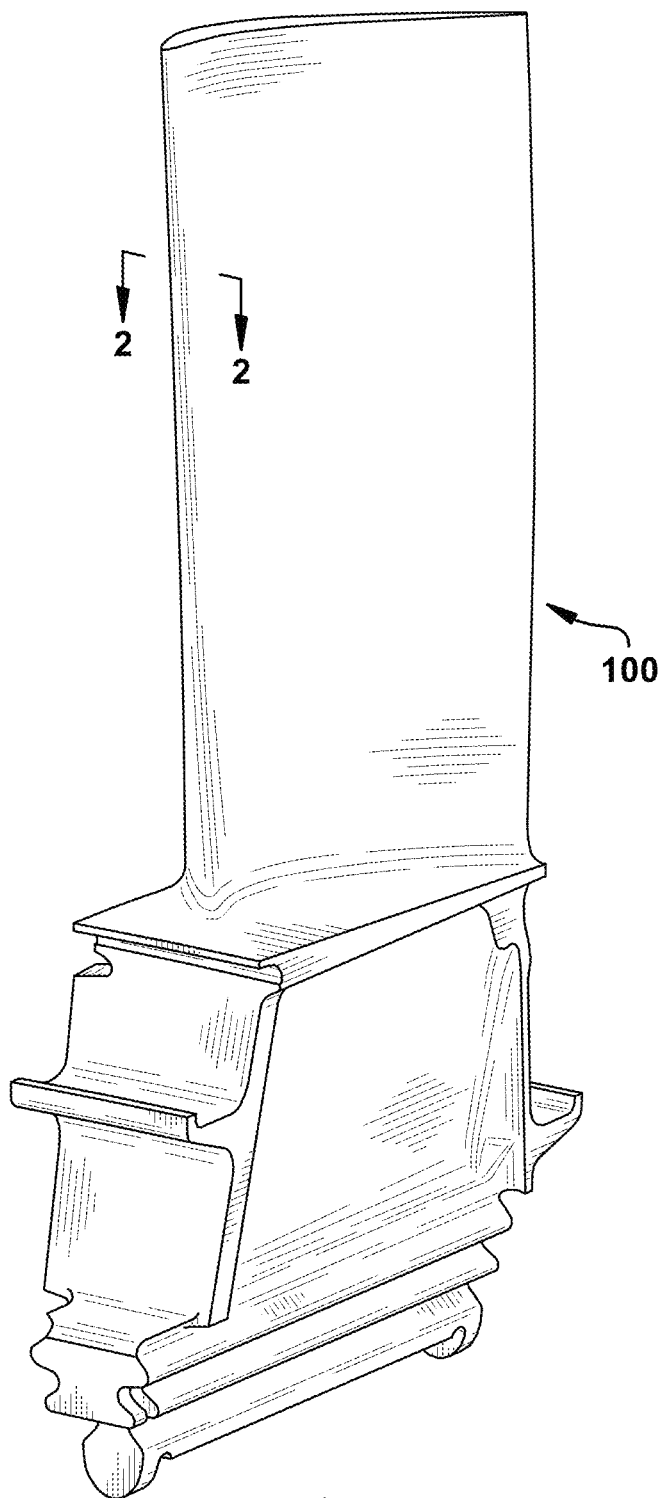
FIG. 1 shows a perspective view of an illustrative multilayer component in the form of a turbine blade.
Figure 2:
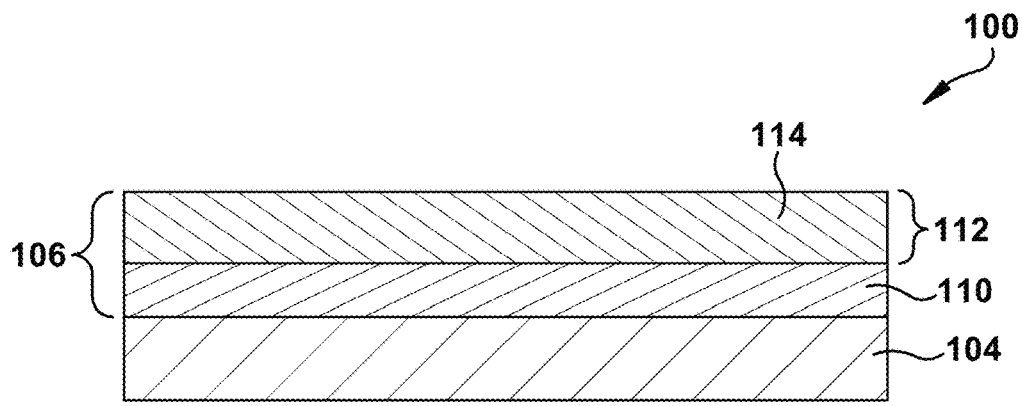
FIG. 2 shows a cross-sectional view of illustrative layers of a multilayer component.

FIG. 1 shows a perspective view of an illustrative multilayer component 100 in the form of a turbine blade. The teachings of the disclosure can be applied to any multilayer component made using any method of formation of the layers, e.g., welding, brazing, thermal spray, etc. As shown in the cross-sectional view of FIG. 2, multilayer component 100 may include a plurality of material layers. In the example shown, one or more protective layers 106 may be over substrate 104. Substrate 104 may include any metal or metal alloy that acts as a metal substrate, or a ceramic such as ceramic matrix composite. For purposes of a turbine blade, substrate 104 may include, for example, a superalloy, which may refer to an alloy having numerous excellent physical characteristics compared to conventional alloys, such as but not limited to: high mechanical strength, high thermal creep deformation resistance, etc. Superalloys include but are not limited to: Rene 108, CM247, Haynes alloys, Incalloy, MP98T, TMS alloys, CMSX single crystal alloys, N5, GTD 444, MarM 247 and IN 738. Alternatively, substrate 104 can include a variety of other metals or metal alloys. "Gamma prime" (γ') is the primary strengthening phase in nickel-based alloys. Example high gamma prime superalloys include but are not limited to: Rene 108, N5, GTD 444, MarM 247 and IN 738. In one embodiment, bond coat 110 may include a gamma-gamma prime structure (e.g., γ' phase [Ni3(Al, Ti)] phase in gamma matrix γ-Ni(Co,Cr)), and in another embodiment, substrate 104 may include a gamma-beta structure, e.g., β-NiAl phase in gamma matrix γ-Ni(Co,Cr). In terms of ceramic, substrate 104 can include any now known or later developed ceramic configured to perform in the hot gas path environment.

Protective layer(s) 106 may include any now known or later developed protective layer for, for example, protecting substrate 104 from a hot, corrosive environment. In one embodiment, protective layer(s) 106 may include at least one of a bond coat 110 (also known as an overlay coat if used alone), and a top coat 112 over the bond coat (note, "top coat" does not necessarily indicate layer 112 as the outermost coating). Bond coat 110 may include any now known or later developed bond coat material such as but not limited to: nickel or platinum aluminides, nickel chromium aluminum yttrium (NiCrAlY) or nickel cobalt chromium aluminum yttrium (NiCoCrAlY). Bond coat 110 may include a gamma-gamma prime structure (e.g., γ' phase [Ni3(Al, Ti)] phase in gamma matrix γ-Ni(Co,Cr)). In one embodiment, bond coat 110 may include a metal (M) with chromium-aluminum-yttrium alloy (MCrAlY) such as those commercially available from Amdry as model numbers 4522A, and 4522C. Bond coat 110 may be applied using, for example, a high velocity oxygen fuel (HVOF) application, a low pressure plasma spraying (LPPS) or an atmospheric plasma spraying (APS).

A thermal barrier coating (TBC) layer 114 may be provided over bond coat 110. TBC layer 114 material may include, for example, yttria-stabilized zirconia (YSZ), mullite and alumina.

Figure 3:
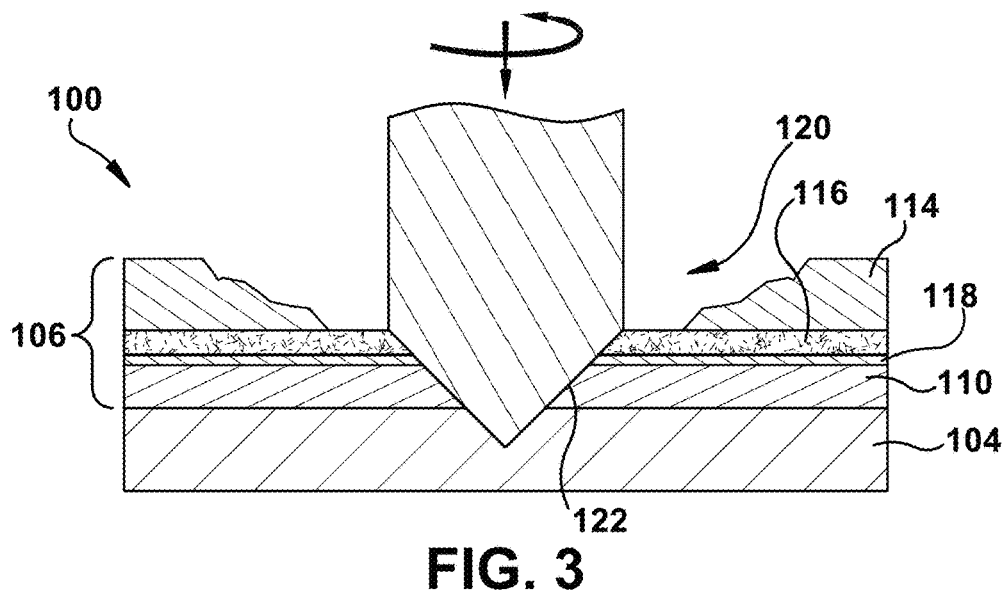
FIG. 3 shows a cross-sectional view of creating an opening according to one embodiment of the disclosure.

During operation, as shown in FIG. 3, elements may diffuse from bond coat 110, creating a depletion layer 118, some of which may eventually oxidize, creating a thermally grown oxide layer 116 (hereinafter "oxide layer 116"). Depending on substrate 104 composition and how bond coat 110 is formed, oxide layer 116 may or may not be formed during operation by diffusion of aluminum, e.g., γ' phase [Ni3(Al, Ti)] phase in gamma matrix γ-Ni(Co,Cr) from bond coat 110.

Figure 4:
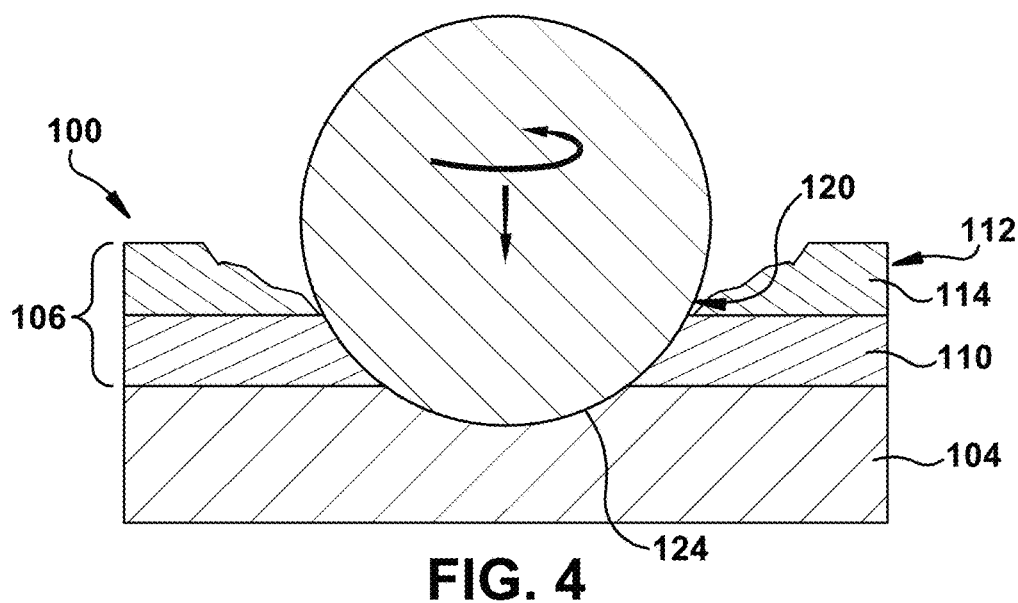
FIG. 4 shows a cross-sectional view of creating an opening according to another embodiment of the disclosure.

Three example arrangements of substrate 104 and bond coat 110 for which embodiments of the disclosure are advantageous include the following. A) Substrate 104 with a MCrAlY bond coat 110 of gamma-gamma prime structure applied by HVOF or LPPS, which exhibits depletion in bond coat 110, creating depletion layer 118, that is identifiable using the teachings of the disclosure. Here, for example, aluminum diffuses and oxidized to form oxide layer 116. Embodiments of the disclosure allow for measurement of the depletion of bond coat 110. B) Substrate 104 with a MCrAlY bond coat 110 of gamma-beta structure applied by APS. Here, as shown in FIG. 4, no depletion occurs and only bond coat 110 thickness is measured using embodiments of the disclosure, i.e., because degradation of bond coat 110 cannot be measured with this method. C) Substrate 104 with a MCrAlY bond coat 110 of gamma-beta structure applied by HVOF or LPPS. This latter arrangement exhibits depletion layer 118 in bond coat 110, as shown in FIG. 3, due to operation (like arrangement A) that is identifiable using the teachings of the disclosure, i.e., aluminum diffuses and oxidizes to form oxide layer 116. While two to three protective layers 106 have been illustrated, it is emphasized that the teachings of the disclosure are applicable to any number of layers and various diffusing element(s). Materials other than TBC can also be employed.

FIGS. 3 and 4 also show creating an opening 120, i.e., a test site opening, having a predefined geometry partially into multilayer component 100 at a selected location on a surface of the multilayer component 100. Prior to forming opening 120, in most cases as shown in FIG. 3, at least a portion of TBC layer 114 is removed, e.g., by grit or sand blasting. Only an area of TBC layer 114 necessary to create opening 120, e.g., by drilling, needs to be removed. That is, not all of TBC layer 114 needs to be removed, only an area slightly larger than an area of a tool used to make opening 120. Opening 120 can be created in a number of ways to form a predefined geometry in multilayer component 100. In one embodiment, shown in FIG. 3, opening 120 is created by drilling to create a cone-shaped hole 122. Other holes of varying shape are also possible. For example, FIG. 4 shows an opening 120 created by calotte grinding to create a spherical segment opening 124. Other material removal tools, e.g., a milling tool, can also be used to create a predefined geometry in multilayer component 100. "Predefined geometry" may include any shape for which the points, lines, surfaces, angles, lengths and other dimensions are known. As will be described, the predefined geometry allows dimensions obtained from an image of opening 120 to be used to calculate quantitative data about layers and in particular bond coat 110, such as but not limited to: layer thicknesses, a depletion level, an inter-diffusion level, or the existence of a heat affected zone. In one example of the FIG. 3 embodiment, a drill bit may have a precise point angle between approximately 130 and 150°, and a diameter of, for example, approximately 2.5 millimeters to 7 millimeters. A location of opening 120 can be user selected to, for example, provide visual assessment of the components (new-make/after use) and define material properties, where desired. More than one opening 120 can be used to test various localized areas of multilayer component 100. Dependent on component condition, different parameters can be assessed at different locations without the conventional limitations based on a specified cut-up plan for the component that would be required if destructive testing was used. Masks (not shown) can be used for regular checks at reproducible locations.

Figure 5:
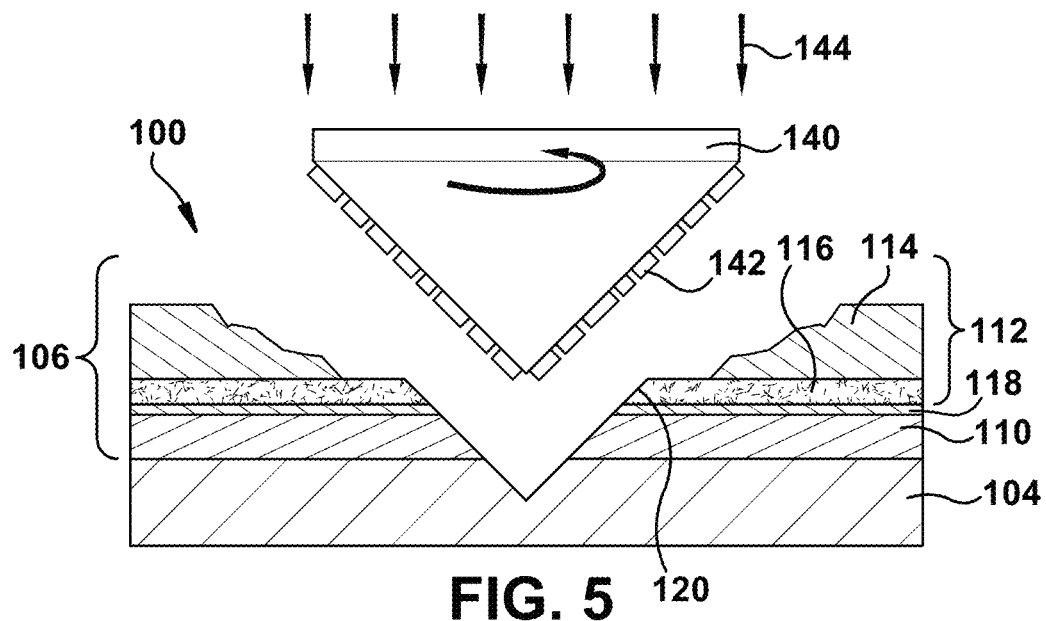
FIG. 5 shows a cross-sectional view of optionally increasing the contrast of the layers in the opening according to one embodiment of the disclosure.

As shown in FIG. 5 for the FIG. 3 drilling embodiment, opening 120 exposes each of material layers 104, 110 (116, 118 where present) including substrate 104. That is, at least some portion of each layer 104, 110 (116, 118 where present) is revealed by opening 120, e.g., a surface, a corner, an edge, etc. An opening 120 size may be based on a variety of factors such as but not limited to: coating thickness, expected worst case wall penetration thickness, minimum and/or maximum thickness of opening 120 desired, etc. An appropriate drill bit diameter and angle may be selected based on any of those factor(s). Substrate 104 should be exposed to a minimal degree, and should be so exposed in a manner to not create a crack or other extensive damage therein. Drilling speed and down pressure are precisely controlled to achieve the above situation.

In some cases, it is beneficial to increase the contrast compared to that present after opening 120 is created. FIG. 5 also shows optionally increasing a contrast of the exposed plurality of material layers 104, 110, 118 exclusively in opening 120. In one embodiment, the process can include polishing the exposed plurality of material layers 104, 106. This process may include, for example, polishing using a felt 140 with a diamond paste 142. In this case, increasing the contrast may also optionally include etching 144 the exposed plurality of material layers 104, 106, e.g., after polishing. The etching may include using any now known or later developed etchant such as but not limited to: a molybdic-etchant for aluminum rich phases, or Murakami-etchant for chromium rich phases. The surface contrast can also be enhanced by electrochemical etching. Polishing may be advantageous, for example, where bond coat 110 is depleted, such as in arrangements A) and C), described herein. In this fashion, embodiments of the disclosure can attain bond coat 110 thickness and depletion layer 118 thickness, i.e., how much of bond coat 110 is diffused forming a depletion layer 118 (and oxide layer 116) and how much remains as bond coat 110. The depletion layer 118 thickness and the bond coat 110 thickness can be related to remaining lifetime of bond coat 110, i.e., life expectancy of bond coat 110. In other embodiments, it is not necessary to increase the contrast, i.e., there is no polishing or etching performed. This latter process may be applied to certain bond coats 110 that are not depleted, e.g., any deterioration is due to inner oxidation such as with arrangement B), described herein.

Figure 6:
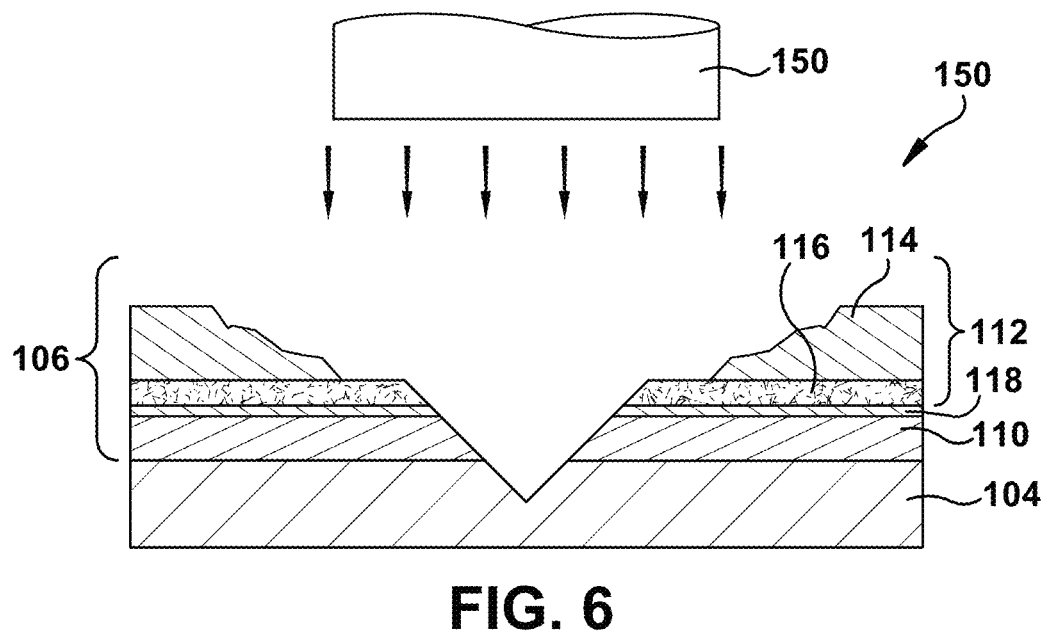
FIG. 6 shows a cross-sectional view of creating an image of the layers in the opening according to one embodiment of the disclosure.

FIG. 6 shows creating an image of exposed plurality of material layers 104, 106 in opening 120 using a digital microscope 150, e.g., a handheld and portable version. Digital microscope 150 may include any now known or later developed microscope. In one embodiment, digital microscope 150 can be handheld and portable so it can be used in the field of use of multilayer component, e.g., inside a turbine.

Figure 7:
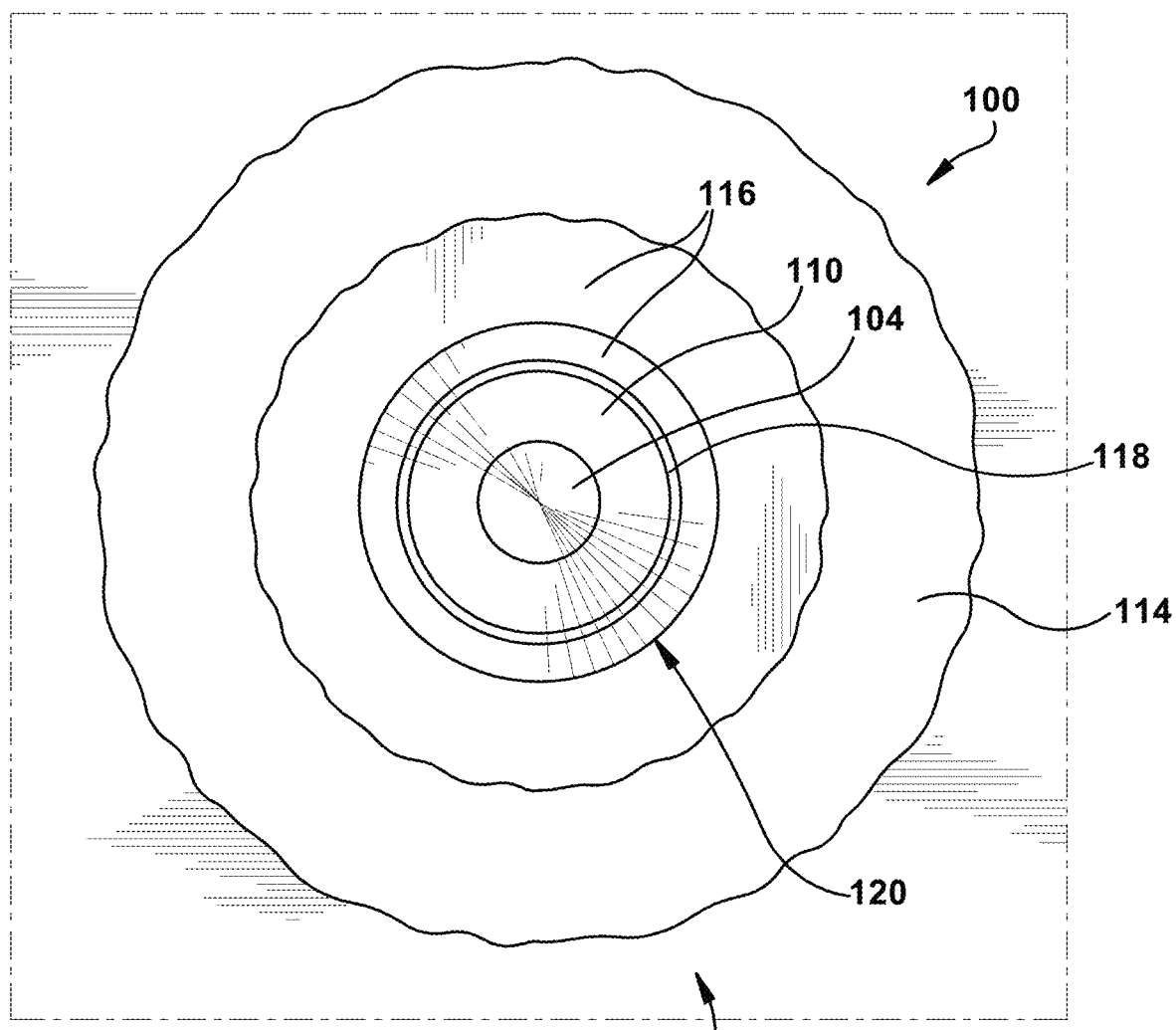
FIG. 7 shows an illustrative image of the layers in an opening according to one embodiment of the disclosure.
Figure 8:
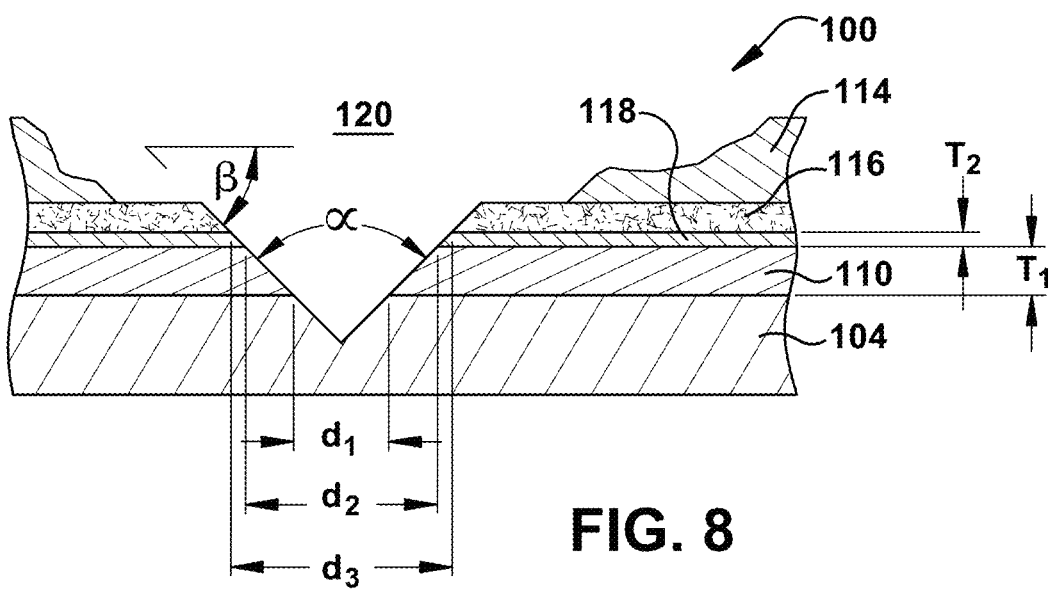
FIG. 8 shows a schematic view of layers of the opening for calculating layer thicknesses according to an embodiment of the disclosure.

FIG. 7 shows an example image 152 of opening 120 and the exposed material layers for a used multilayer component 100. It is understood that a newly manufactured multilayer component 100 would only have bond coat 110 and substrate 104 present. A depth or thickness of bond coat 110 can be calculated from image 152 based on the predefined geometry of opening 120. FIG. 8 shows a schematic of dimensions pulled from image 152 for opening 120 FIG. 6, e.g., lateral diameters of layers $d_1$, $d_2$ and $d_3$ of layers 104, 110, 118, respectively. The predefined geometry of opening 120 provides a known angle α of exposed surfaces of layers 104, 110, 118. Application of trigonometry leads to $T1=((d_2/2)-(d_1/2))\tan \beta$, and $T2=((d_3/2)-(d_2/2))\tan \beta$. Angle β is the angle of opening 120 relative to horizontal. Thus, the thickness of bond coat 110 (T1) can be determined. Further, where present, a thickness of depletion layer 118 (T2) can be determined. The thickness of depletion layer 118 (T2) indicates an amount of depletion of bond coat 110. That is, thickness of depletion layer 118 can be used to determine the remaining life (life expectancy) of bond coat 110.

Based on the calculated thickness(es), determinations of quantitative data can be ascertained such as but not limited to: bond coat 110 thickness, i.e., intact bond coat 110 thickness, and depletion layer 118 thickness resulting from the diffusion process. For new manufacture, a thickness of bond coat 110 can be used to confirm, for example, the quality of the product and to benchmark bond coat thickness for later evaluation. For used multilayer components 100, the amount of depletion of bond coat 110 can be used, for example, to project remaining life expectancy using conventional algorithmic or empirically based modeling techniques. For example, for a known bond coat material, if 50% of bond coat 110 is used, it may indicate it has 1200 operating hours left under expected operating conditions of multilayer component 100. Further, the thickness of bond coat 110 and/or the thickness of depletion layer 118 can also be used to determine life expectancy of bond coat 110.

Figure 9:
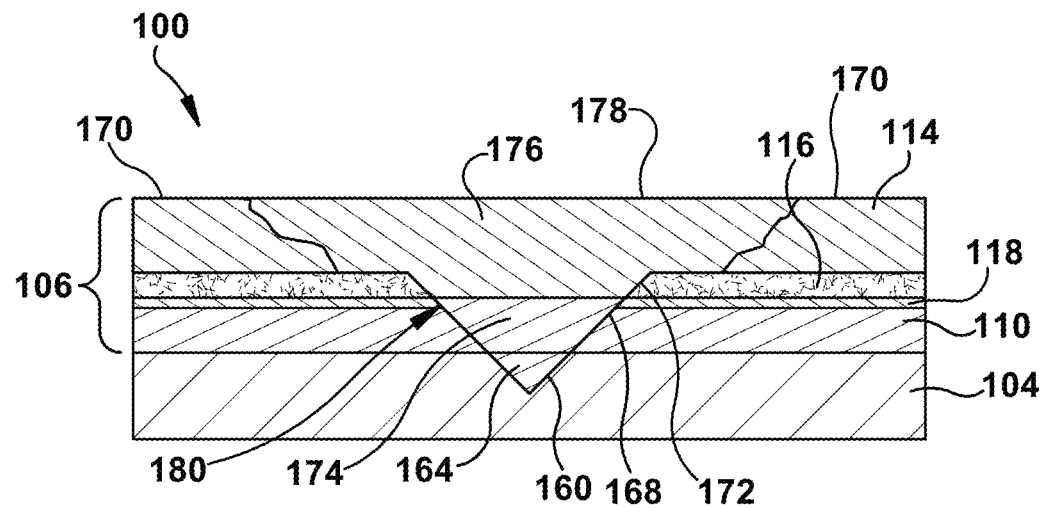
FIG. 9 shows a cross-sectional view of layers of a repaired multilayer component according to an embodiment of the disclosure.

In contrast to conventional destructive material testing, multilayer component 100 can be assessed, and can be repaired, where necessary. That is, opening 120 can be repaired, allowing multilayer component 100 to be used for an intended purpose thereof, e.g., as an airfoil. The repairing process can include any now known or later developed repair processes for an opening 120 in the materials provided. For example, substrate 104 and bond coat 110 repair may include at least one of laser wire welding or tungsten inert gas (TIG) welding. The repairing device may be handheld. Alternatively, substrate 104 and/or bond coat 110 may be repaired by a thermal spray process, e.g., APS, flame spraying, etc. TBC layer 114 repair may include any thermal spray process such as one of APS and flame spraying. Alternatively, TBC 114 may include a slurry coating process. Oxide layer 116 is not repaired. FIG. 9 shows opening 120 (for FIG. 3 embodiment) repaired.

As noted, embodiments of the method described herein may be performed prior to use of the multilayer component 100, i.e., after manufacture, to confirm proper fabrication and/or benchmark layer thicknesses. Alternatively, embodiments of the disclosure can be performed at a geographic location of use of multilayer component 100, e.g., a power plant in the case of a turbine rotor blade. Where multilayer component 100 is on site, it can be dismounted from its use setting, or it can remain in its use setting, e.g., inside a turbine. If it remains in place, multilayer component 100 can be used after the repairing of opening 120, e.g., without reinstallation. If on site, the repairing of opening 120 may include using at least one handheld device, e.g., TIG welder, flame spray, etc.

FIG. 9 shows a cross-sectional view of a used (i.e., ex-service) multilayer component 100 after exposure to methods according to embodiments of the disclosure. Multilayer component 100 may include a substrate 104, a bond coat 110 over substrate 104, and a TBC layer 114 over bond coat 110. TBC layer 114 has a first outer surface 170 having indications of exposure to a hot gas path environment, e.g., from use in a gas turbine. That is, first outer surface 170 may be, for example, dirty, worn, and/or have a different color or shade. A filled opening 172 is in substrate 104, bond coat 110 and, where provided, TBC layer 114. Oxide layer 116 and/or depletion layer 118 may exist outside of filled opening 172. Filled opening 172 includes a substrate repair fill 164, including material that is either identical to or similar to (perhaps better properties) the metal of substrate 104, that fills filled opening 172 in substrate 104, i.e., in a substrate portion 160 of opening 120. Multilayer component 100 also includes a bond coat repair fill 174 filling filled opening 172 in bond coat 110, i.e., in a bond coat portion 168 of opening 120. Bond coat repair fill 174 includes material either identical or similar to (perhaps better properties) bond coat 110. As shown, since opening 120 in substrate 104 is very small, substrate repair fill 164 may be the same material as bond coat repair fill 174, i.e., repair fill 164 and 174 are the same. In this situation, bond coat repair fill 174 extends into substrate 104. A thermal barrier coating (TBC) plug 176 fills filled opening 172 in TBC layer 114, i.e., where TBC layer 114 was removed. TBC plug 176 has a second outer surface 176 having no or less indications of exposure than first outer surface 170 of TBC layer 114 since it has not seen an operation atmosphere and temperature or has been applied with a different manufacturing process, i.e., it is newer (maybe with slightly different properties e.g. porosity) and has less dirt thereon, and may have a different color/shading than TBC layer 114. Either of TBC plug 176 (shown) or bond coat repair fill 174 may fill filled opening 172 in oxide layer 116 and/or depletion layer 118. In the FIG. 9 example, opening 120 has a periphery having at least a portion with a cone-shape. It is understood that where opening 120 according to the FIG. 4 embodiment is employed, opening 120 would have a periphery having at least a spherical shaped portion. In any event, however, as shown in FIG. 9, the periphery of opening 120 is invisible to the naked eye in an outermost layer, e.g., TBC layer 114 and TBC plug 176. A final repair process may include contouring outer surfaces 170, 176 of multilayer component 100, e.g., by grinding or polishing.

Figure 10:
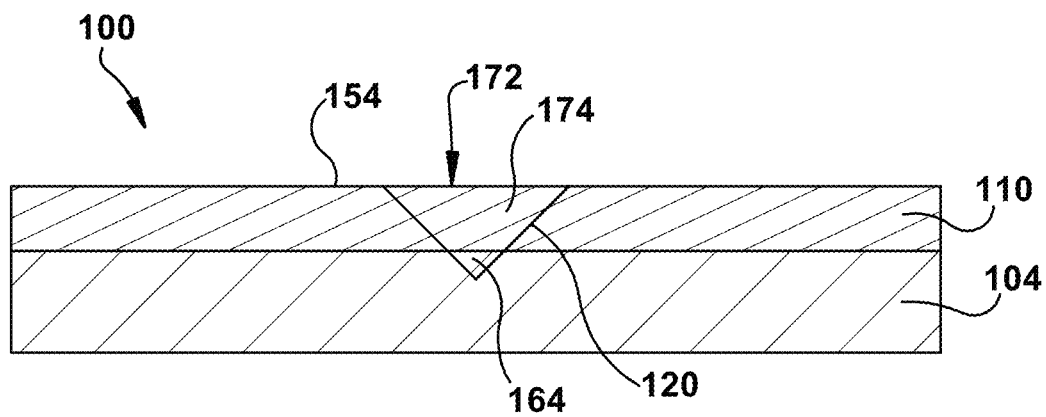
FIG. 10 shows a cross-sectional view of layers of a repaired multilayer component according to another embodiment of the disclosure.

FIG. 10 shows another embodiment in which the repair includes only repairing substrate 104 with substrate repair fill 164, and bond coat 110 with bond coat repair fill 174, in filled opening 172. Here, depletion layer 118, oxide layer 116 and TBC layer 114 are not present. Again, since opening 120 in substrate 104 is very small, substrate repair fill 164 may be the same material as bond coat repair fill 174, i.e., repair fill 164 and 174 are the same. TBC layer 114 is not provided or repaired. A final repair process may include contouring a surface 154 of multilayer component 100, e.g., by grinding or polishing. In FIG. 10, opening 120 existence is invisible to the naked eye on surface 154. However, if cut open, remnants of opening 120 may be observed in multilayer component 100.

Embodiments of the disclosure provide quantitative assessment (e.g., thickness, depletion, bonding, heat affected zone, etc.) of a multilayer component (e.g., substrate with coating, brazing, welding, etc.) having a minimal destructive impact on the commercial component while enabling its reuse by a localized material restoration, where necessary. The method thus avoids full metallurgical investigation by sectioning/destruction of commercial parts, and avoids scrap-parts for metallurgical investigation of multilayer components. In addition, the methods allow for condition-based repair, and enables repair scope reduction compared to destructive testing techniques. The methods can be used during manufacture or after use, in the field.

The foregoing drawings show some of the processing associated according to several embodiments of this disclosure. In this regard, it should also be noted that in some alternative implementations, the acts noted may occur out of the order described or, for example, may in fact be executed substantially concurrently or in the reverse order, depending upon the act involved. Also, one of ordinary skill in the art will recognize that additional steps that describe the processing may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method of analyzing layer thickness of a multilayer component, the method comprising:
    creating an opening having a predefined geometry partially into the multilayer component at a selected location on a surface of the multilayer component, wherein the multilayer component includes a plurality of material layers including at least a substrate, a bond coat, and a depletion layer, and the opening exposes each of the plurality of material layers including the substrate;
    creating an image of the exposed plurality of material layers in the opening using a digital microscope;
    calculating at least a thickness of the bond coat and a thickness of the depletion layer of the exposed plurality of material layers from the image and based on the predefined geometry of the opening; and
    determining a life expectancy of the bond coat based on the thickness of the bond coat and the thickness of the depletion layer.

2. The method of claim 1, wherein the bond coat includes MrCrAlY, and wherein the depletion layer extends over the bond coat.

3. The method of claim 2, wherein the plurality of material layers further includes an oxide layer over the depletion layer.

4. The method of claim 1, wherein creating the opening comprises drilling to create a cone-shaped hole.

5. The method of claim 1, further comprising increasing a contrast of the exposed plurality of material layers exclusively in the opening from that present after the opening creating.

6. The method of claim 5, wherein the increasing contrast includes:
    polishing the exposed plurality of material layers; and
    etching the exposed plurality of material layers.

7. The method of claim 6, wherein the polishing includes using a felt with a diamond paste, and the etching includes using an etchant.

8. The method of claim 1, wherein the plurality of material layers includes an oxide layer over the bond coat and the bond coat over the substrate.

9. The method of claim 1, further comprising repairing the opening, allowing the multilayer component to be used for an intended purpose thereof.

10. The method of claim 1, wherein prior to the drilling, the multilayer component further includes a thermal barrier coating (TBC) layer over the oxide layer, and further comprising removing at least a portion of the TBC layer prior to the drilling, and wherein the repairing includes repairing the at least a portion of the TBC layer.

11. The method of claim 1, wherein the method is performed prior to use of the multilayer component.

12. The method of claim 11, wherein prior to the drilling, the multilayer component further includes a thermal barrier coating (TBC) layer over the bond coat, and further comprising removing at least a portion of the TBC layer prior to the drilling, and wherein the repairing includes repairing the at least a portion of the TBC layer.

13. The method of claim 1, wherein the method is performed at a geographic location of a use site of the multilayer component.

14. The method of claim 13, wherein the repairing the opening includes using at least one handheld device.

15. A multilayer component, comprising:
    a substrate;
    a bond coat over the substrate;
    a thermal barrier coating (TBC) layer over the bond coat, the TBC layer having a first outer surface indications of exposure to a hot gas path environment;
    a depletion layer; and
    a filled opening in the substrate, the bond coat and the TBC layer, the filled opening including:
        a substrate repair fill filling the filled opening in the substrate,
        a bond coat repair fill filling the filled opening in the bond coat, and
        a thermal barrier coating (TBC) plug filling the filled opening in the TBC layer, the TBC plug having a second outer surface having no or less indications of exposure to the hot gas path environment than the first outer surface;
    wherein the substrate repair fill filling the filled opening in the substrate is the same material as the bond coat repair fill filling the filled opening in the bond coat.

16. The method of claim 1, wherein the thickness of the bond coat is calculated as to $T1=((d_2/2)-(d_1/2))\tan \beta$ and the thickness of the depletion layer is calculated as $T2=((d_3/2)-(d_2/2))\tan \beta$, wherein $\beta$ is the angle of the opening relative to horizontal, $d1$ is the lateral diameter of the substrate, $d2$ is the lateral diameter of the bond coat, and $d3$ is the lateral diameter of the depletion layer.

17. A method of analyzing layer thickness of a multilayer component, the method comprising:
    drilling to create an opening having a predefined geometry partially into the multilayer component at a selected location on a surface of the multilayer component, wherein the multilayer component includes a plurality of material layers including a substrate, a bond coat over the substrate, and a depletion layer, and wherein the opening exposes each of the plurality of material layers;
    increasing a contrast of the exposed plurality of material layers exclusively in the opening from that present after the opening creating by polishing the exposed plurality of material layers, and etching the exposed plurality of material layers;
    creating an image of the exposed plurality of material layers in the opening using a digital microscope;
    calculating a thickness of the bond coat from the image and based on the predefined geometry of the opening;
    determining a life expectancy of the bond coat based on the thickness of the bond coat and the thickness of the depletion layer; and
    repairing the opening, allowing the multilayer component to be used for an intended purpose thereof.

18. The method of claim 17, wherein the method is performed at a geographic location of a field of use site of the multilayer component.

19. The method of claim 17, wherein prior to the drilling, the multilayer component further includes a thermal barrier coating (TBC) layer over the oxide layer, and further comprising removing the TBC layer prior to the drilling, and wherein the repairing includes repairing the TBC layer.

20. The method of claim 17 wherein calculating a thickness of the bond coat further comprises calculating the thickness of the bond coat as $T1=((d_2/2)-(d_1/2))\tan \beta$ and the thickness of the depletion layer $T2=((d_3/2)-(d_2/2))\tan \beta$, wherein $\beta$ is the angle of the opening relative to horizontal, d1 is the lateral diameter of the substrate, d2 is the lateral diameter of the bond coat, and d3 is the lateral diameter of the depletion layer.

* * * * *